(No Model.) 3 Sheets—Sheet 1.
G. BOFINGER.
TYPE WRITER CIPHOGRAPH.
No. 396,529. Patented Jan. 22, 1889.
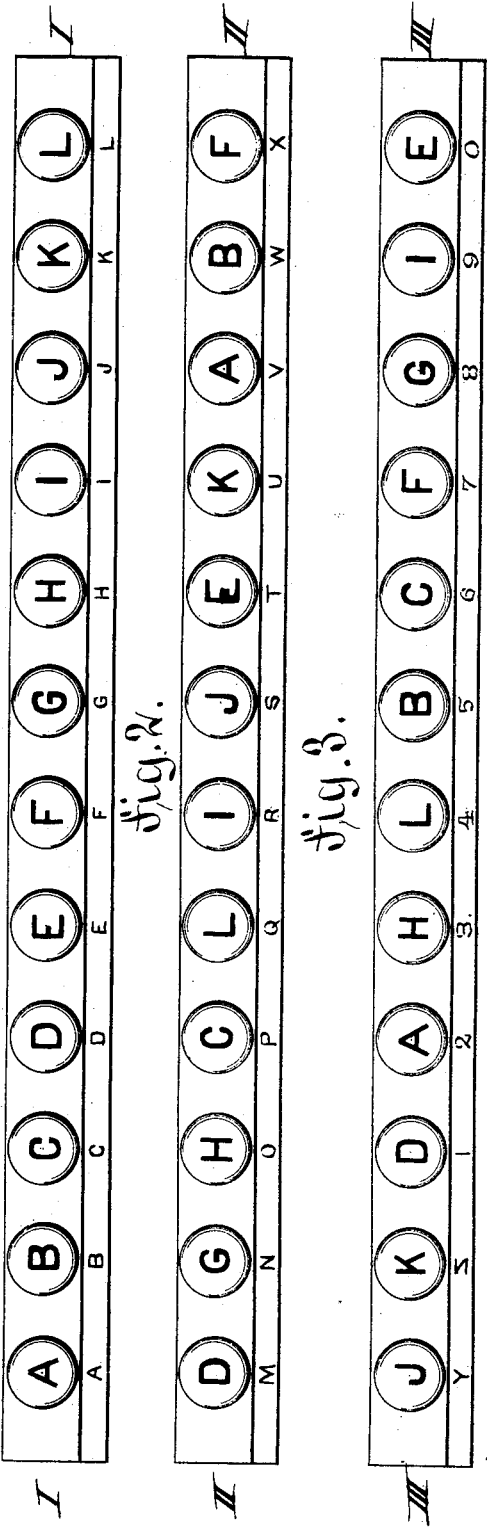

(No Model.) 3 Sheets—Sheet 2.

G. BOFINGER.
TYPE WRITER CIPHOGRAPH.

No. 396,529. Patented Jan. 22, 1889.

WITNESSES:
Harry King
C. Co. Need

INVENTOR:
G. Bofinger
By his Att'ys (No Model.) 3 Sheets—Sheet 3.

G. BOFINGER.
TYPE WRITER CIPHOGRAPH.

No. 396,529. Patented Jan. 22, 1889.

WITNESSES:

INVENTOR:
G. Bofinger

UNITED STATES PATENT OFFICE.

GUSTAV BOFINGER, OF NEW YORK, N. Y.

TYPE-WRITER CIPHOGRAPH.

SPECIFICATION forming part of Letters Patent No. 396,529, dated January 22, 1889.

Application filed February 28, 1887. Serial No. 229,074. (No model.)

*To all whom it may concern:*

Be it known that I, GUSTAV BOFINGER, a citizen of the United States, residing at New York, in the county of New York and State of New York, have invented a new and useful Type-Writer Ciphograph, of which the following is a specification.

The object of this invention is to provide a simple and convenient attachment for type-writing machines—such as the Remington, Hammond, and others—whereby communications or documents in ordinary text may be written in cipher by the operator of the machine for transmission through the mail or otherwise, and retranslated into the original text on the type-writer of the receiver.

Figure 4:
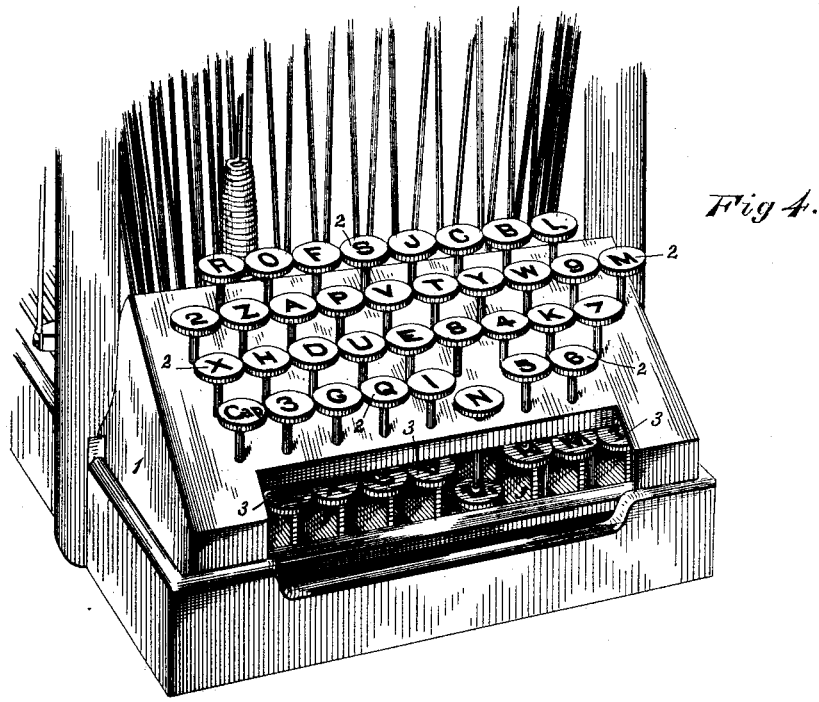
Figure 5:
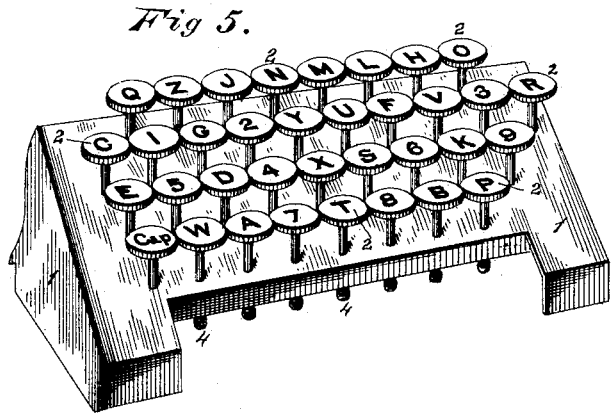
Figure 6:
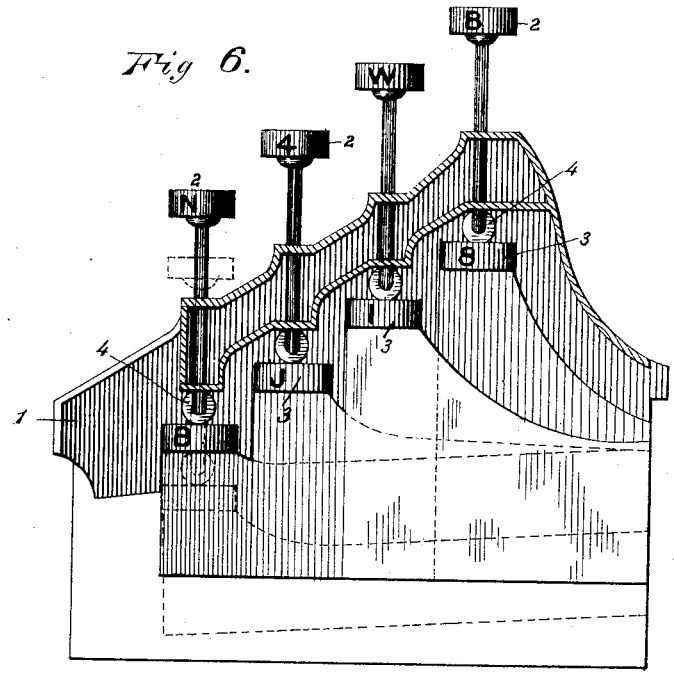
Figure 7:
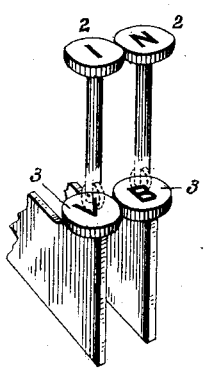
Figure 8:
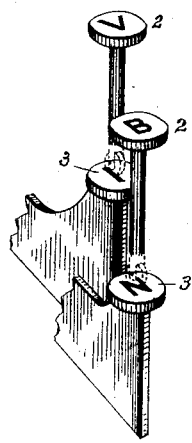

In the accompanying drawings, Figure 1 represents a number of keys of a normal key-board of a type-writing machine, the letters below the keys indicating the letters which are on the impression-types actuated by the respective keys, the letters on the types corresponding with the letters on the keys. Fig. 2 illustrates a fragment of a ciphering key-board, in which the letters or characters on the respective keys differ from the letters or characters on the corresponding impression-types, the letters below the keys indicating the letters on the corresponding types. Fig. 3 shows a fragment of a deciphering key-board, in which, also, the letters or characters on the respective keys differ from the letters or characters on the corresponding types, the relative arrangement of the letters or characters being the reverse of their arrangement on the ciphering key-board. Fig. 4 is a perspective view of a ciphering key-board applied to a Remington type-writing machine. Fig. 5 is a perspective view of a deciphering key-board adapted for application to a Remington type-writer, the letters or characters being arranged to correspond inversely with the arrangement of the letters or characters on the ciphering key-board shown in Fig. 4, whereby the deciphering key-board is adapted for translating into the original text the cipher produced by the ciphering-board. Fig. 6 is a transverse section cut through the plane in Fig. 4 occupied by the keys N 4 W B of the ciphograph key-board. Fig. 7 is a diagram illustrating the relative position of the keys of the normal and cipher key-boards for translating the word "in" into cipher. Fig. 8 illustrates the relative positions of the keys of the normal and decipher key-boards for retranslating the cipher of the word "in" into its original form.

Similar numerals of reference indicate corresponding parts in the different figures.

In the ordinary key-board of a type-writing machine the indicating letter or character on each key corresponds with the letter or character on the impression-type actuated by that key, as illustrated in Fig. 1, whereby the operator in using the keys according to the original text of the manuscript or "copy" will reproduce on the printed sheet the identical text of said copy.

In this improved type-writer ciphograph the indicating letters or characters of the ciphographic alphabet are disposed on finger-pieces in abnormal relation to the letters or characters of the impression-types of the machine. In a key-board type-writer constructed according to this invention the letter or character on each key is different from the letter or character on the impression-type actuated by that key, as indicated in Figs. 2 to 8, the letters or characters on the keys of the cipher key-board being arranged abnormally to produce any arbitrary combinations on the printed sheet, and the letters of the decipher key-board being arranged abnormally to the keys on the impression-types, but in correspondence inversely with the letters on the cipher key-board.

In its application to a Remington type-writing machine this improved ciphographic attachment comprises a detachable frame or casing, 1, preferably composed of sheet metal and adapted for adjustment over the normal key-board of said machine. A series of finger-pieces, in the form in this instance of vertically-movable auxiliary keys 2, pass through holes in said casing and rest at their lower ends on the keys 3 of the normal key-board, being preferably provided, respectively, with anti-friction rollers 4. Each of these auxiliary keys is provided on its upper face with an indicating letter or character which differs from the letter or character on the normal key, on which the auxiliary key rests. The auxiliary keys of the cipher key-board are arranged according to any cipher agreed upon between the parties communicating in cipher, and the keys of the decipher key-board are arranged in such relation as to retranslate the cipher produced by the corresponding cipher key-board into the original text. Separate frames and separate sets of auxiliary keys may be used for the cipher and decipher key-board, or the same frame and the same set of auxiliary keys may be used both for ciphering and deciphering by rearranging the auxiliary keys on the frame to form either a cipher or a decipher board.

Figs. 7 and 8 illustrate the translations of the word "in" into cipher and its retranslation into its original letters. The operator, having this word before him on the manuscript to be copied, or having it given him by the person dictating, will use the keys of the auxiliary cipher key-board corresponding to the proper spelling of the word, and by depression of these keys the cipher "VB" will be produced on the printed sheet by the impression-types of the type-writing machine. The receiver of this cipher will use a ciphograph having its auxiliary keys arranged as a decipher key-board, and will strike successively on said decipher-board the keys having, respectively, the letters "V" and "B," in accordance with the cipher on the printed sheet before him, and these auxiliary keys will actuate the normal keys, having, respectively, the letters "I" and "N," and consequently the impression-types having the same letters produce the word "in" on the printed sheet in the type-writing machine. Thus the operator in retranslating the cipher follows the letters of the cipher message to reproduce the original text, and need not be cognizant of the cipher employed. In this manner, by comparatively simple means, documents and other communications can be printed in cipher from the original text by an operator without knowledge of the cipher, and may be reproduced in the original text on a type-writing machine by an operator ignorant of the cipher. For many business purposes this is a great advantage, especially as the ciphering can be accomplished by the type-writing machines in general use, and an almost unlimited number of different cipher combinations can be made with the letters and figures of a type-writing machine.

I claim as my invention—

1. The combination, with the actuating-keys of a type-writing machine, of finger-pieces provided with indicating letters or characters disposed in abnormal relation to the normal keys.

2. The combination, with the key-board of a type-writing machine, of an auxiliary key-board, the keys of the auxiliary key-board being provided with indicating letters or characters which are disposed in abnormal relation to the keys of the normal key-board.

3. A ciphographic attachment for a type-writing machine, consisting of a frame or casing for adjustment over the key-board of a type-writing machine, and a series of auxiliary keys supported in said casing, and provided with indicating letters or characters which are disposed in abnormal relation to the keys of the ordinary key-board.

In testimony that I claim the foregoing as my invention I have signed my name in presence of two subscribing witnesses.

GUST. BOFINGER.

Witnesses:
PAUL GOEPEL,
MARTIN PETRY.